Dec. 8, 1942.  C. D. AUSTIN  2,304,724
PROJECTION OF STEREOSCOPIC IMAGES
Filed March 8, 1940   2 Sheets-Sheet 1
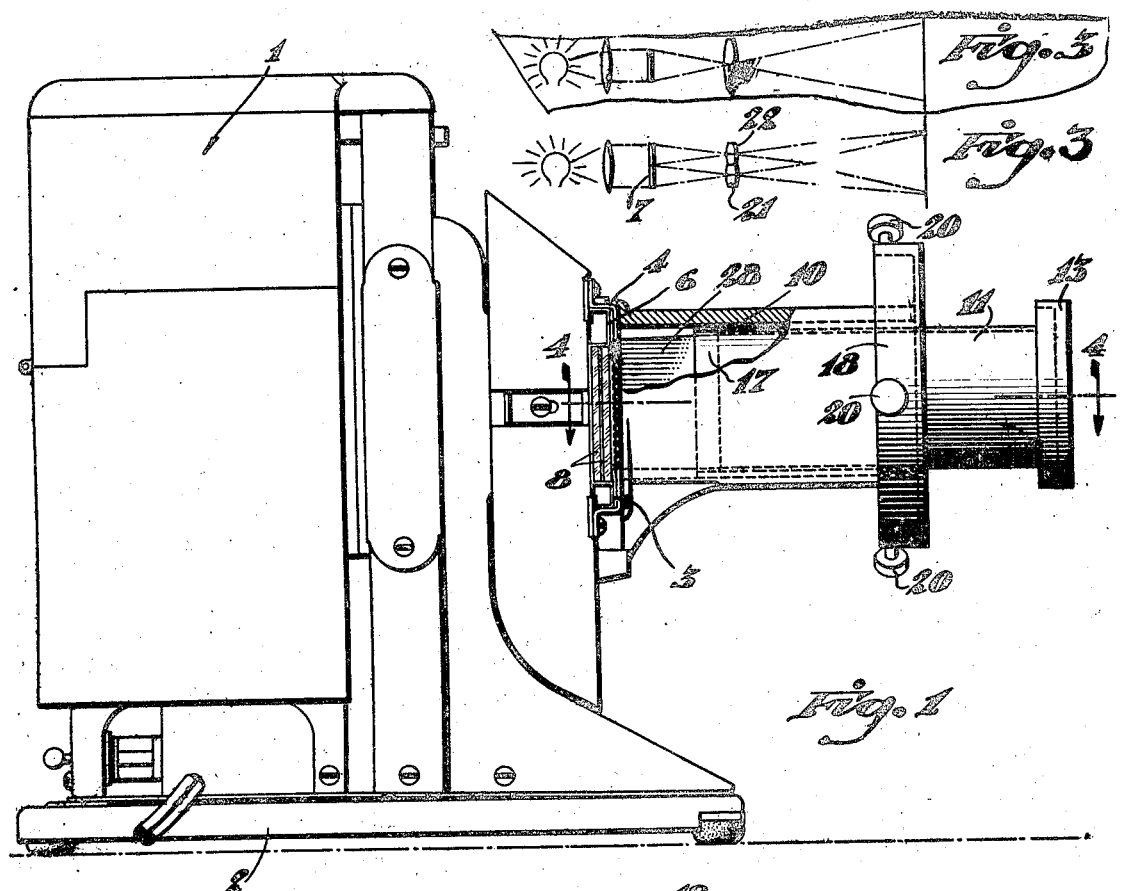
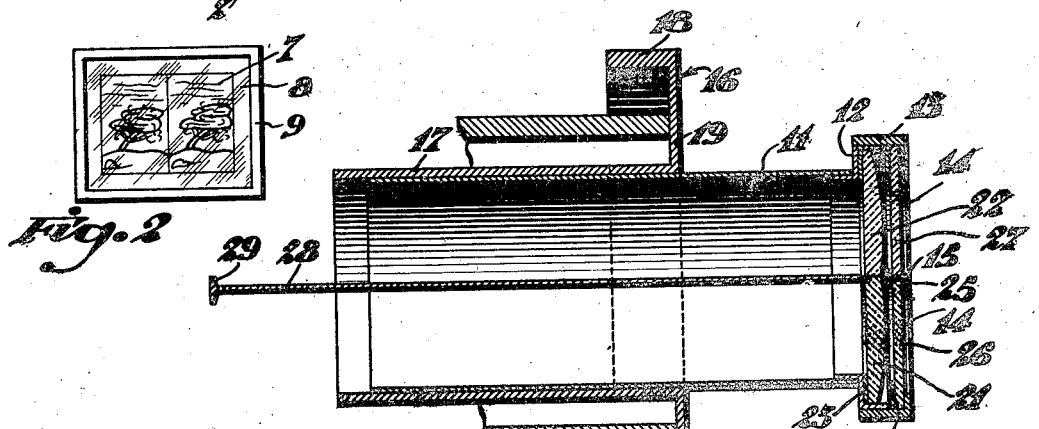
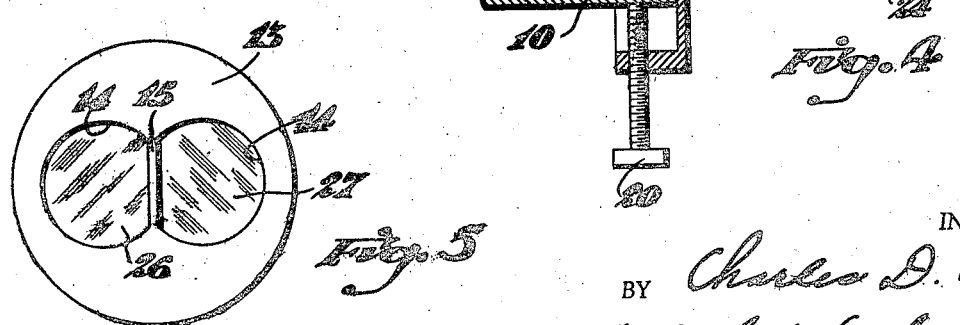
INVENTOR.
BY Charles D. Austin
Word & Wood ATTORNEYS

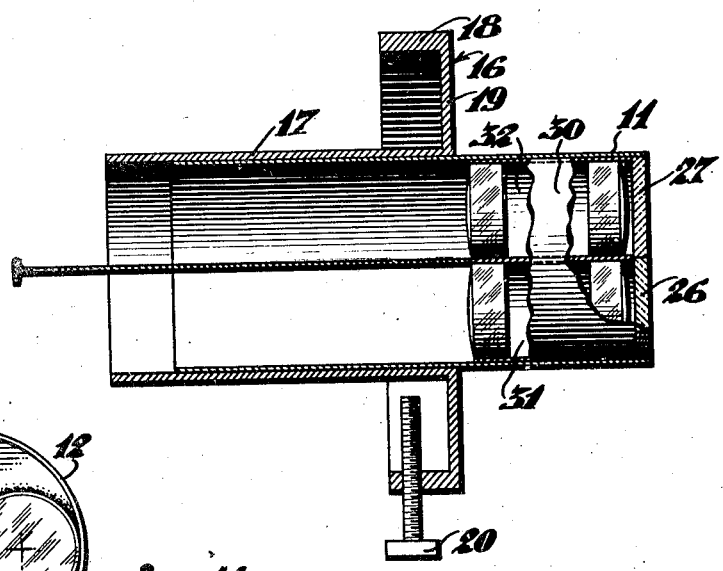
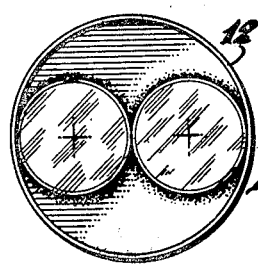
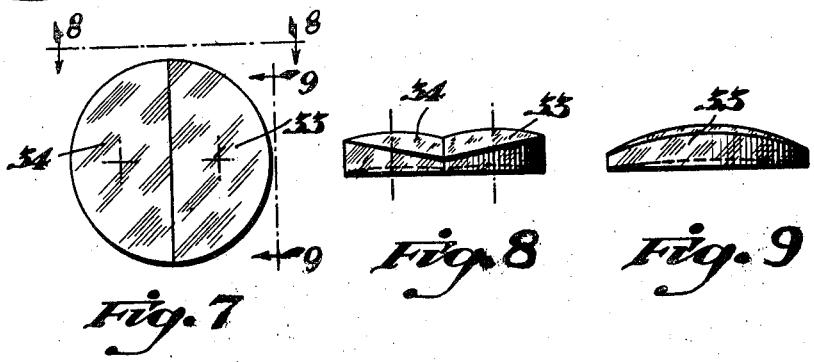
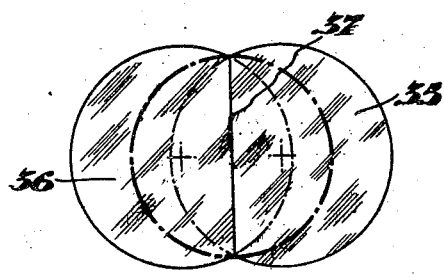
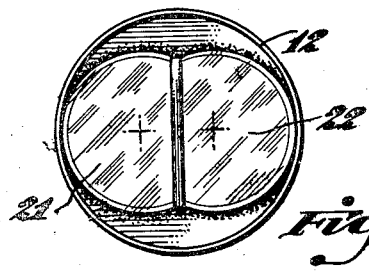

Patented Dec. 8, 1942

2,304,724

UNITED STATES PATENT OFFICE 2,304,724

PROJECTION OF STEREOSCOPIC IMAGES

Charles D. Austin, Cincinnati, Ohio, assignor to Advertising Displays Incorporated, Covington, Ky., a corporation of Kentucky Application March 8, 1940, Serial No. 322,978

2 Claims. (Cl. 88—16.6)

This invention relates to the display of stereoscopic pictures. It is directed particularly to an attachment which is adapted to be used in conjunction with a conventional picture projector and stereo transparencies, whereby pictures exhibiting stereoscopic effects may be enjoyed.

The primary object of the present invention has been to provide a simple attachment for converting a conventional projector into one suitable for projecting a pair of images in substantially superimposed relationship from a stereo slide or transparency. A further object is to provide a very inexpensive attachment capable of producing this desired result.

In a copending application Serial No. 279,144, filed June 14, 1939, entitled Photographic apparatus, I have described an attachment adapted to be used in conjunction with a single lens camera for taking stereoscopic pictures, for instance, upon 35 mm. film or larger. The purpose of the present invention is to provide a simple and rugged piece of apparatus which can be attached to a projector, so that the pictures taken with the camera attachment, as well as other stereo views, may be displayed upon a screen. Heretofore the apparatus available for exhibiting such pictures has been the old fashioned stereoscope, which can be used by only one person at a time, or the very expensive stereo projection equipment which is beyond financial reach of the typical amateur photographer as well as most professionals.

The conventional picture projector is a relatively inexpensive unit comprised of a source of light appropriately housed, a slide transport within which the transparency to be projected is positioned, a condenser lens, and a focusing objective. A transparency carrying a pair of images in spaced relationship cannot be exhibited from such a machine because its lens equipment is incapable of either superimposing the images, in order that they be merged to exhibit the desirable third dimensional effect, or of projecting images which may be identified by the right and left eyes respectively.

Briefly, the apparatus of the present invention is comprised of a lens tube adapted to be inserted in the projector, or mounted upon it, in place of the conventional objective with which the projector ordinarily is provided. This lens tube comprises a pair of objectives, the optical axes of which are spaced apart substantially in accordance with the spacing of the stereoscopic images upon the slide. These lenses cause the images to be thrown onto the screen in stereoscopic registry. The lenses of the pair are focused upon the respective images of the slide, each lens thereby projecting a full image upon the screen.

In the tube supporting the lenses, analyzing discs are provided for identifying the right and left hand images by varying the character of the light projected through them. These discs or membranes may be of polarizing material appropriately positioned, or may be colored membranes. Now, when these projected images are viewed in such manner that the right eye sees only the image corresponding originally to the right hand point of view of the scene or subject, and vice versa, both images are assimilated to provide the perspective effect. For this latter purpose spectacles having color discs or polarizing membranes complementary to those in the lens equipment are utilized. The use of analyzing discs for identification of images and the use of the special spectacles is old in the art, generally speaking. However, the use of them in conjunction with the lens system of the present invention is believed to be novel in several important respects.

The next feature of the invention resides in the provision of a dividing wall in the lens tube between the lenses, for separating the light passing to the lenses from the respective images, in order that blurring, and particularly the formation of secondary images, be avoided. This dividing wall, in a preferred embodiment of the invention, is provided with a mask which extends transversely of it at the rearward edge, whereby the light from the images is effectively sequestered without having the wall extend into dangerous proximity to the slide itself. For instance, if the dividing wall extended too far rearwardly, there would be danger of it hitting and scratching or breaking the slide when it is being moved back and forth for focusing.

A further object of the invention is to provide lenses of maximum aperture in the limited space available within the confines of the lens tube.

There are other features of the invention which are described in the following specification. From the foregoing description of the principles of the invention and the following detailed description of an embodiment of it, those skilled in the art readily will comprehend the various modifications to which it is susceptible.

In the drawings:

Figure 1 is a side elevation of a typical projector equipped with the apparatus of the invention.

Figure 2 is an illustration of a typical transparency providing a stereoscopic pair of images.

Figure 3 is a diagrammatic view illustrating the optical system of a projector used and equipped in accordance with the present invention.

Figure 4 is a sectional view taken on the line 5—5 of Figure 1.

Figure 5 is an elevation showing the face of the attachment.

Figure 6 is a sectional view similar to Figure 4, showing a modified form of apparatus.

Figure 7 is a face view showing a modified form of lens for the apparatus.

Figures 8 and 9 are side elevations of the lens of Figure 7 and are taken as shown in Figure 7.

Figure 10 is a diagrammatic view of the modified lens shown in Figure 7 and illustrates the development of the lens from the lens blanks.

Figures 11 and 12 are further views of lenses of modified form adapted for use in conjunction with the apparatus of the invention.

While neither the projector proper nor the slide transparency forms any part of the present invention, they are described here in some detail in order that the present advance may be better understood.

The conventional projector which is illustrated in the drawings is comprised of a light housing 1 mounted upon a base 2. The light housing contains a suitable source of illumination, for example, an incandescent light. A slide transport assembly, indicated generally at 3, is provided at the forward face of the light housing. The latter assembly includes a slideway member 4, which extends across the path of light so as to serve as a guide for a slide 6, within which the transparency to be projected is mounted. In the conventional projector, the slide 6 extends beyond the transport guideway so that while one transparency is being projected another transparency can be loaded into the slide, either from one side or the other, in the usual manner.

The projector shown in Figure 1 is adapted particularly to operate in conjunction with slides of the type shown in Figure 2. In these units the film 7, or transparency, carrying the stereoscopic pair of images, is placed between glass plates 8—8 which are held together by a metal frame 9. The images of the pair are designated "right and left hand" in the drawings.

Ahead of the slide transport assembly, the projector 1 is provided with a tubular barrel 10 which in turn telescopically contains a focusing lens for focusing the projected image upon a screen.

The apparatus of the present invention is adapted to be used in conjunction with the projector 1 when the conventional lens is removed from it, and a typical embodiment of this apparatus is shown in Figure 4. It comprises a sleeve or tube 11 which, at one end, carries an annular ring 12. The ring forms a seat for the lens assembly and also threadedly carries a cap 13 having apertures 14, with a central dividing member 15 extending therebetween.

The tube 11 is of such diameter that it may be slid into the lens barrel of the conventional projector; for example, the internal diameter of the lens barrels of most projectors on the market at present is approximately 1½ inches in diameter and, therefore, the tube 11 preferably is made slightly smaller than this dimension so that it may be telescoped into the barrel.

However, the lens barrels of some projectors are considerably larger in diameter than 1½ inches and, for enabling the tube 11 to be used in conjunction with such tubular members, the adapter ring 16 is provided. This unit comprises a sleeve portion 17, for reception of tube 11, an annular ring 18, which is sufficiently large to be slipped over even the larger sizes of lens barrels, and a member 19 interconnecting the sleeve 17 and the annular ring 18. The annular ring 18 is bored and threaded radially to receive clamp screws 20—these engage the external surface of a lens barrel whose diameter internally is too great to receive or support tube 11.

As shown in Figure 4, a pair of lenses 21 and 22 are seated within the ring 12 in any suitable manner, for example, they may be cemented in place by means of the cement 23. The lenses 21 and 22 are positioned side by side within the tube, and may be focused in unison upon the respective images of the transparency by sliding the lens tube in or out of the barrel or adapter sleeve. It is preferable that the lens seat 12 and the ring 13 surrounding it be of greater diameter than the tube 11, in order that all possible area of the lens be devoted to light passageway.

Each of the lenses 21 and 22 has a portion cut away along chordal lines in such manner that the optical centers of the lenses be spaced from one another substantially the same distance as corresponding points upon the right and left hand images upon the slide are spaced. Further features of the lens system and various modifications of it are disclosed at a following point in the specification.

A ring 24 is installed within the cap 13 to rest upon the forward edge of the lens seat 12 and this ring also is provided with a divider 25 extending across the joint line between the two lenses. The cap, like the ring, is provided with apertures for permitting the light to pass through the assembly to the screen.

Analyzing membranes 26 and 27 rest upon the ring 24 and are held in position by the face of cap 13. The analyzing membranes 26 and 27 are provided for differentiation of the right and left hand images projected upon the screen and may be polarizing discs or filters of different color. For instance, the material commercially known as "Polaroid" may be used for these membranes, the polarizing axes of the two discs being out of phase 90°. If color filters are used instead, they may be, for example, of red and green color. By virtue of these analyzing membranes the right and left hand eyes are caused to see the right and left hand images in their normal relationship, when the images are viewed through spectacles comprised of complementary analyzing discs or membranes.

A divider or wall 28 is installed within the tube 11 intermediate the lenses 21 and 22. The divider extends diametrically across the tube throughout its length and also extends beyond the rearward edge of the tube, terminating preferably in a mask 29 which projects laterally, for a short distance, from either face of the dividing wall. The mask 29, extending sidewisely of the dividing wall, enables the length of it to be shortened to such an extent that there be no danger of causing the rearward edge of the dividing wall to come into engagement with the slide. The dividing wall may either be fixed permanently to the tube or may be slidable therein if adjustability is desired.

Dividing wall 28 and the mask 29 confine the light passing from one image to a course through the lens focused upon that image. In other words, it prevents light passing through one image from passing through the lens focused upon the other image. By this arrangement, extraneous reflections, the formation of secondary images and blurring is avoided.

The extension of the dividing wall beyond the rearward edge of the tube 11 serves the purpose of separating the light passing from the respective images of the pair without having the tube extend so far rearwardly that the corners of the field of the images might be obscured from view by the tube.

It is highly desirable and in fact requisite, as a practical matter, that the effective aperture, (i. e. F value) of the lens of a projector be as great as possible, in order that as much light as possible passing through the slide pass also through the lens, or, in other words, in order that there be suitable illumination of the image without the use of special or high intensity bulbs or the like. The aperture, however, is a function of lens diameter and focal length and, in the present instance, the diameter of the lens is limited by virtue of the limitation as to the dimension of the tube within which the lenses of the pair are placed side by side for projecting stereoscopic images.

There are two principal features which, in general, govern the nature of the lenses used in the present apparatus and these are the focal length of the lenses and their configuration relative to the area of the lens tube across which they are to extend. The lenses in each instance are placed side by side, each lens being focused upon a stereoscopic image of the pair. If the lenses are to be of the conventional circular configuration then, as a general proposition, it is desirable for the focal length of them to be relatively short in order that the effective aperture of each lens be as large as possible. For instance, in a typical embodiment lenses of circular outline and of about two inches in focal length may be utilized and the diameter of these may be such that the F value of them be in the neighborhood of approximately 3.5.

On the other hand, lenses of diameters too large to enable them to be placed side by side within the lens tube may be configurated as by cutting them along chordal lines. In this instance the area of each lens, or its relative diameter, is such that, for a F value of approximately 3.5 to be obtained, its focal length may be increased. If lenses of still greater aperture are desired to be installed in lens tubes of the conventional overall diameter, for instance 1½ inches, then they may embody both features, that is, short focal length and special configuration providing large relative diameter. In either event the optional centers of the lenses are spaced apart substantially the same distance as the point to point distance beween the stereoscopic images carried by the slide.

The lenses shown in Figure 4 and in Figures 6 to 12 provide these requisite characteristics. In Figure 6, the use of compound lenses is illustrated. The lenses of the compound objective are carried in a barrel 30 which is provided with bores 31 and 32, within which the lens elements are supported. The barrel 30 is adapted to slide telescopically within the tube 11 and, at the forward end of the barrel, the respective analyzing discs 26 and 27 are cemented in position.

Each compound objective may be comprised of two, three, or four elements (depending upon the refinements and corrections which are desirable or requisite), all supported within the apertures in the barrel. Any suitable lens system providing lenses of such focal length may be utilized in the making of the compound objectives.

The lens shown in Figures 7, 8, 9 and 10 is comprised of right and left hand elements 33 and 34. The optical centers of the elements 33 and 34 are as shown in Figure 8, and the development of this lens is shown in Figure 10. The faces of right and left hand blanks 35 and 36 are ground to the desired curvature, and these blanks are then cut along chordal lines to meet as at 37. The periphery of the assembly thus provided is then ground, e. g. along the dot and dash line shown in Figure 11, so that the final objective is of circular contour and is of such diameter that it may be fitted within the seat 12 of the lens tube. Thus, as distinguished from the lens system shown in Figure 4, this assembly is made by cutting lens blanks, and joining them along a chordal line, then cutting the lenses peripherally so that the maximum aperture is utilized. If the lenses were cut along the chordal line only, the distance across the widest part of the assembly would be too great to permit their installation within the tube.

It will be understood, of course, that the diameter of the lens of Figures 7, 8, 9 and 10 is shown in relation to its development. Once the curvatures of the various parts of the elements forming this lens are established these elements may be configurated to their predetermined final contours and then assembled.

The lens of Figure 12 is of the general type shown in Figure 4, but is provided with a dividing wall between the segments for supporting them. In this lens the lens elements 21 and 22 have relative diameters too great for them to be placed side by side within the ring 12 and the lens barrel, but by cutting these lenses along chordal lines their optical centers are brought together in accordance with the spacing of the stereoscopic images but the lenses are still of such effective area that they substantially cover the entire area of the lens tube. Lenses of this general type essentially are a compromise between the circular type of lenses of relatively short focal length, as shown in Figure 11, and the lenses of the type shown in Figures 7, 8 and 9 which cover the entire area within the lens tube.

It should be noted that the overall length of the lens tube, or the overall length from the optical center of the lens system to the rearward extremity of the divider, is proportioned relative to the focal length of the lenses used in the tube, so that when the lenses are focused upon the images the tube does not extend so far rearwardly as to cut the fields of the image and the divider, in turn, extends sufficiently rearwardly to divide the light passageways and prevent the formation of secondary images upon the screen.

In utilizing the attachment, the lens tube 11 is inserted in the lens barrel of the projector, either with or without the use of the adapter, depending upon the diameter of the lens barrel. The tube is positioned so that the dividing wall is in substantial alignment with the line of division between the stereoscopic pair of images, and the tube is slid in or out of the lens barrel until the pictures are brought into focus upon the screen. By virtue of the fact that, in each instance, the spacing of the lens elements is substantially the same as the spacing of given points upon the stereoscopic pair of images, it is not requisite that the lens elements be optically angulated with respect to one another for superimposition of the images on the screen. When the images are exhibited and viewed through appropriate spectacles, the effect of third dimension is provided.

The apparatus is adapted for use in conjunction with moving picture projectors as well as so called "still" projectors, and it will be understood that the present equipment may be embodied permanently in a projector, if desirable, for specialized purposes.

Having described my invention, I claim:

1. Apparatus for projecting stereoscopic images, comprising a lens barrel, a pair of lenses mounted side by side within the barrel and having common contact along a chordal line, the optical axes of the lenses being spaced in accordance with the spacings of stereoscope images of a transparency to be projected, and a divider mounted longitudinally of the tube in alignment with the chordal line between the lenses, with the divider extending beyond the tube, and terminating in a mask projecting laterally from either side of the divider distances effective for maintaining separation of the rays of light passing through the respective images.

2. In combination with a pair of lenses adapted for the projection of stereoscopic pictures from stereoscopic images, a lens tube for supporting the lenses and a divider carried by the tube intermediate the optical centers of the lenses, the divider constituting a membrane for preventing the formation of secondary images when stereoscopic pictures are projected, and terminating at a point beyond the tube in a mask constituted by wings which extend laterally from either face of the divider distances effective for maintaining separation of the light rays coming from the respective stereoscopic images.

CHARLES D. AUSTIN.